(12) United States Patent
Shido et al.

(10) Patent No.: US 6,423,967 B1
(45) Date of Patent: Jul. 23, 2002

(54) DETECTION APPARATUS AND DETECTION METHOD TO BE USED FOR SCANNING PROBE AND OBSERVATION APPARATUS AND OBSERVATION METHOD

(75) Inventors: Shunichi Shido, Zama; Takeaki Itsuji, Atsugi, both of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/570,406

(22) Filed: May 12, 2000

(30) Foreign Application Priority Data

May 13, 1999 (JP) .......... 11-132297
Mar. 6, 2000 (JP) .......... 2000-060543

(51) Int. Cl.[7] .................. G21K 7/00
(52) U.S. Cl. .................. 250/306; 250/307
(58) Field of Search .......... 250/201.3, 306, 250/307, 214 R (56) References Cited

U.S. PATENT DOCUMENTS 5,075,548 A * 12/1991 Kajimura .......... 250/306
5,623,476 A    4/1997 Eguchi et al. .......... 369/126
6,201,226 B1 * 3/2001 Shimada et al. .......... 250/201.3
6,201,227 B1 * 3/2001 Tomita .......... 250/201.3

FOREIGN PATENT DOCUMENTS

JP  63 161552  7/1988
JP  63 161553  7/1988

* cited by examiner

*Primary Examiner*—Robert H. Kim
*Assistant Examiner*—Jurie Yun
(74) *Attorney, Agent, or Firm*—Fitzpatrick, Cella, Harper & Scinto

(57) ABSTRACT

A detection apparatus for detecting the surface of a specimen by means of a cantilever having a probe and a piezo resistance element, which comprises a first circuit for detecting an electric current flowing through the piezo resistance element and a second circuit for detecting an electric current flowing through the probe. The electric current flowing through the piezo resistance element and the electric current flowing through the probe are detected by way of a common current path.

20 Claims, 7 Drawing Sheets

DETECTION APPARATUS AND DETECTION METHOD TO BE USED FOR SCANNING PROBE AND OBSERVATION APPARATUS AND OBSERVATION METHOD

BACKGROUND OF THE INVENTION

1. Field of the Invention

This invention relates to an apparatus and a method for detecting the surface profile and the electric properties of a specimen by means of a scanning probe unit (which may be a multi-probe unit) utilizing the physical phenomenon that occurs when a probe is brought close to the specimen. The present invention also relates to an apparatus and a method for observing such a phenomenon. More particularly, the present invention relates to an apparatus and a method for detecting the surface profiles and the electric properties of a specimen by means of a scanning probe unit having a piezoelectric resistance cantilever, which observes the atomic force and the electric current arising as a result of the interaction of the probe and the specimen to detect micro-undulations and/or the electric properties of a micro-region on the surface of the specimen from the changes in the signals of such observation.

2. Related Background Art

The development in recent years of the scanning probe microscope (to be referred to as SPM hereinafter) for directly observing the electronic structure of the surface and its neighborhood of a specimen by utilizing the physical phenomenon that appears when a probe is brought close to the specimen has made it possible to obtain a real spatial image of a physical quantity of the specimen with high resolution, regardless if it is of a single crystal substance or of an amorphous substance. The principle which provides the high resolution of the SPM with atomic or molecular level has attracted the attention of the industry and efforts have been paid to feasibly apply it to information recording/reproducing apparatus using a recording medium carrying a recording layer. Japanese Patent Application Laid-Open Nos. 63-161552 and 63-161553 disclose such apparatus. Additionally, as a result of the recent technological development in the field manufacturing ICs, the elements contained in such devices have dimensions of sub-microns, and consequently the SPM technology has been used to evaluates processes for manufacturing such devices. Meanwhile, apparatus to be used for such observation and evaluation purposes is mostly designed to observe both the surface profile and the electric properties of a specimen. When, for instance, observing various aspects of an element prepared by lithography, it may be be necessary to examine the electric properties, the profile of the wires, and the dose of the semiconductor element. Then, both an AFM and an STM may have to be used to observe the surface profile and the electric properties of micro-regions of such an element.

However, when the area to be accessed is very small and both a probe for observing the surface profile of the micro-region and a probe for observing the electric properties of the region are used for the same target area, they have to be rigorously aligned relative to that area and also to each other. To avoid this cumbersome operation, there has been proposed a technology of using a single AFM probe that can obtain both information on the profile of a micro-region and electric information of the region. For instance, an AFM probe coated with metal film that can be used for both an AFM (atomic force microscope) using an optical lever and an STM (scanning tunnelling microscope) for observing electric current is known. A number of AFM probes may have to be arranged in parallel (multi-probe arrangement) for practical applications if the throughput of the process has to be improved. As a matter of fact, such arrangements provide research and development objectives in recent years. Studies are being made to employ conventional semiconductor processes for preparing such probes. For example, in view of the fact that a multi-probe detector having a detection system that comprises a plurality of AFMs carrying an optical lever normally requires a very complex optical system and hence is very large, there has been proposed a system for detecting the quantity of deflection of the lever by detecting the change in the resistance of the piezo resistor of a strain gauge arranged on the AFM optical lever.

As discussed above, an apparatus to be used for the evaluation of a semiconductor device is required to comprise a plurality of combinations of an AFM for observing the profile of the device and an STM for observing the electric properties of the device. However, in such known apparatus comprising AFMs, the same optical lever has to be used for the AFM carrying a piezo resistor (to be referred to as piezo resistance AFM) and also for the STM for detecting the electric properties of the specimen. Then, the lever requires a path (wires) and a detection circuit for detecting the piezo resistance and also a path and a detection circuit for detecting the micro-current. The net result is the need of a very complex process for preparing such an apparatus if the probe and the detection circuits are arranged in a single chip.

SUMMARY OF THE INVENTION

In view of the above described circumstances, it is therefore an object of the present invention to provide an apparatus and a method for detecting the surface profile and the electric properties of a specimen by means of a detection system comprising a scanning probe and a wiring arrangement having a simplified configuration and detection circuits, which make the system feasible to be used for a multi-probe type system. Another object of the present invention is to provide an apparatus and a method for observing a specimen by utilizing such a detection apparatus and/or such a method.

According to the invention, the above objects are achieved by providing a detection apparatus for detecting the surface of a specimen by means of a cantilever having a probe and a piezo resistance element, said apparatus comprising:

a first circuit for detecting an electric current flowing through said piezo resistance element; and a second circuit for detecting the electric current flowing through said probe; wherein the electric current flowing through said piezo resistance element and the electric current flowing through said probe are detected by way of a common current path.

According to the invention, there is also provided an observation apparatus comprising a detection apparatus according to the invention.

In another aspect of the invention, there is provided a detection method for detecting the surface of a specimen by means of a cantilever having a probe and a piezo resistance element, said method comprising the steps of:

detecting an electric current flowing through said piezo resistance element; and detection an electric current flowing through said probe; wherein the electric current flowing through said piezo resistance element and the electric current flowing through said probe are detected by way of a common current path.

BRIEF DESCRIPTION OF THE DRAWINGS

FIGS. 1A and 1B are schematic circuit diagrams of the signal detecting section of the embodiment of detection apparatus according to the invention in Example 1, of which FIG. 1A illustrates the operation of the AFM of the apparatus and FIG. 1B illustrates that of the STM of the apparatus.

DESCRIPTION OF THE PREFERRED EMBODIMENTS

Now, the present invention will be described by way of examples.

EXAMPLE 1

Figure 2:
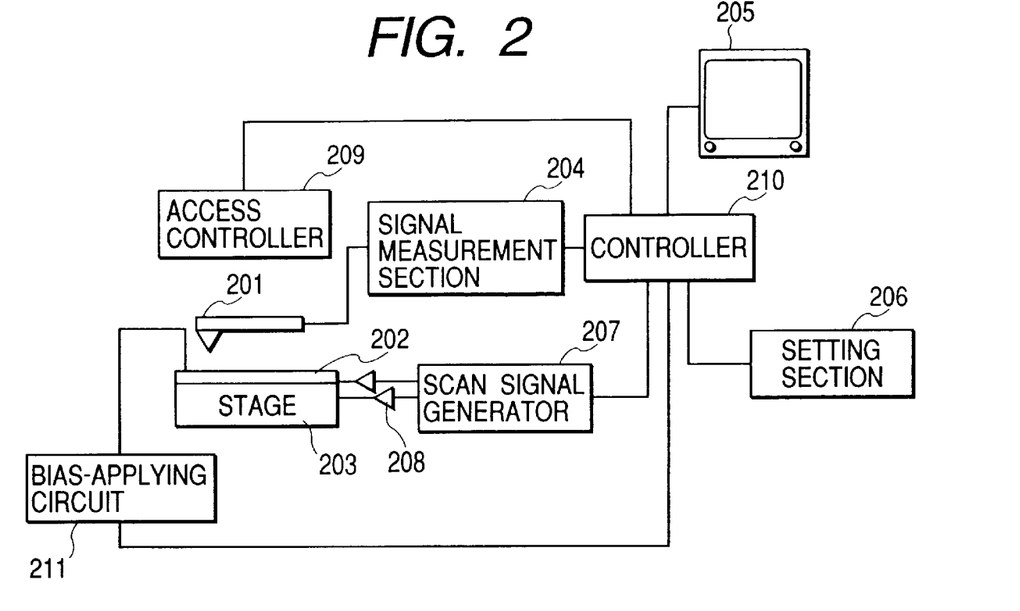
FIG. 2 is a schematic block diagram of the AFM and the STM of the apparatus used in Example 1.
Figure 3:
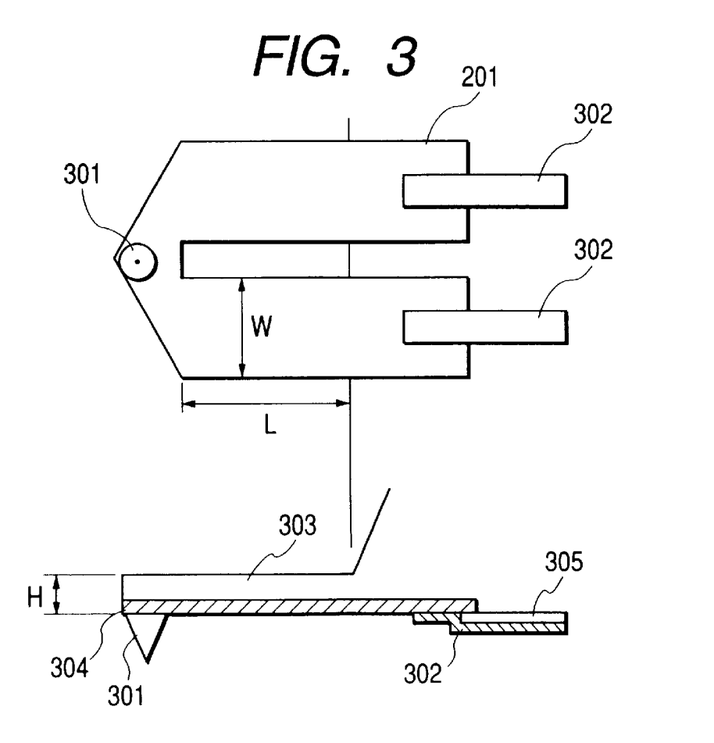
FIG. 3 is a schematic illustration of the piezo resistance lever used in a detection apparatus according to the invention.

FIG. 2 is a schematic block diagram of the signal detection apparatus according to the invention in Example 1. In FIG. 2, reference numeral 201 denotes a cantilever type displacement detection probe unit provided with a piezo resistance as a strain gauge. FIG. 3 is a schematic illustration of the piezo resistance lever used in the detection apparatus. Referring to FIG. 3, an electroconductive probe 301 is held electrically in contact with a piezo resistor 304 arranged at the front end of the lever. In FIG. 3, reference numeral 303 denotes a silicon substrate and reference numeral 302 denotes a wiring pattern, while reference numeral 305 denotes a silicon oxide film for electrically isolating the substrate and the wiring patterns from each other. As for the dimensions of the probe unit, the cantilever has a width W of 20 $\mu$m, a length L of 100 $\mu$m and a height H of 2 $\mu$m. The resonance frequency of the lever is about 15 kHz.

Firstly, the operation of the probe unit as an AFM will be described below. As the lever type probe unit 201 and the specimen 202 to be observed are moved close to each other by an access controller 209, they exert force on each other, which is typically atomic force. When they are brought close to each other to such a distance that the interacting force gets to a predetermined level, a scan signal generator 207 generates a scan signal, which is applied to the XY drive mechanism of a stage 203 carrying the specimen by way of an amplifier 208 to drive the stage and the specimen intraplanarly. Then, the probe scans the surface of the specimen and obtains information of the change in the interacting force that it is expressed as a change in the deflection of the lever, thereby giving the output in the form of a change in the piezo resistance. During the operation, a certain bias is applied to the specimen 202 by a bias-applying circuit 211. The change in the piezo resistance is measured by a signal measurement section 204 to transmit the obtained signal to a controller 210. The controller 210 mainly controls the access controller 209 and the bias-applying circuit 211 according to the values input by the operator by way of a setting section 206. Additionally, it generates an image signal for visualizing the signal from the signal measurement section 204 to a monitor 205.

Now, the operation of the probe unit as an STM (for measuring the electric current) will be described also by referring to FIG. 2. A tunnelling current flows between the lever type probe unit 201 and the specimen 202 to be observed when a predetermined voltage is applied to the specimen 202 by the bias-applying circuit 211, and then the probe unit 201 and the specimen 202 are brought closer to each other than a certain distance. The electric current reflects the electrical state of the surface of the specimen so that the local electrical state of the specimen can be observed by measuring the electric current. As in the case of the AFM, the stage is driven to observe electric current flowing through the probe unit by the signal measurement section 204, thereby obtaining the two-dimensional information of the electric state of the surface of the specimen 202. The obtained information is visualized by the controller 210 so that the operator can observe the visible image on the display screen of a monitor 205.

Figure 1A:
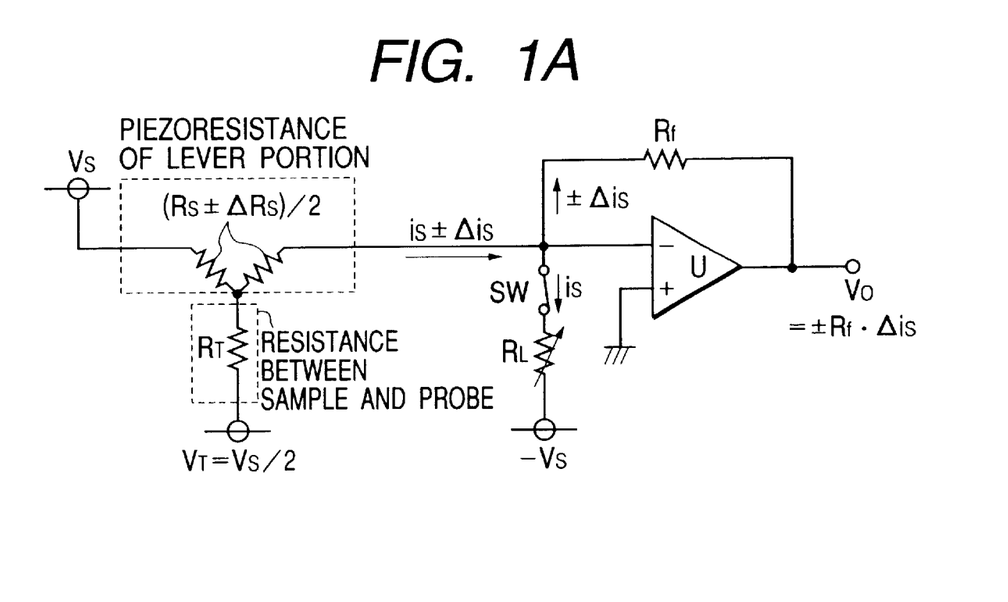
Figure 1B:
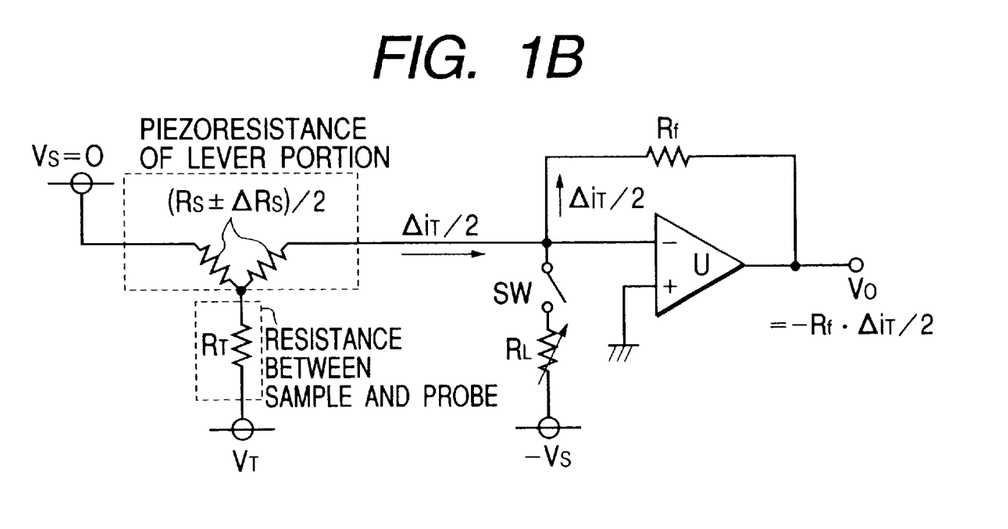

Now, the signal measurement section 204 that is characteristic to the present invention will be described in detail. The signal measurement section 204 has a configuration as schematically illustrated in FIGS. 1A and 1B. Note that the piezo resistance of the lever and the resistance between the specimen and the probe are shown in addition to the signal measurement section 204. Firstly, the operation of the AFM of the apparatus will be described by referring to FIG. 1A. For an apparatus operating as an AFM, the deflection of the piezo resistance lever has to be detected. According to the invention, the piezo resistance (Rs) or the change in the piezo resistance ($\Delta$Rs) is measured by measuring the electric current flowing through the piezo resistor when a predetermined bias Vs is applied thereto. Through the lever, therefrom is a constant current 'is' with respect to the resistance Rs, a variable current $\Delta$is with respect to the resistance $\Delta$Rs which changes in response to the deflection of the lever and a current iT flowing from the specimen by way of the probe. The current iT flowing from the specimen by way of the probe is not necessary for measuring the piezo resistance. However, the current iT can be reduced to substantially nil by applying VT of a half of the bias of the piezo resistance, or VT=Vs/2, to the specimen so as to reduce the voltage between the specimen and the probe to substantially nil, because the lever is prepared by way of a semiconductor process as described above so that the piezo resistance between one of the two bases of the probe unit and the tip of the probe is equal to the piezo resistance between the other base and the tip, or a half of the overall piezo resistance of the probe unit. Note that Rs is about 10 k$\Omega$ while the resistance between the specimen and the probe is generally greater than 100 M$\Omega$ (in the case of a tunnelling current).

Additionally, Rs is generally about several kilo-ohms (k$\Omega$) and $\Delta$Rs/Rs=$10^{-6}$ to $10^{-8}$ (per deflection of 1 nm). Thus, there is normally a dimensional difference of about $10^{-6}$ to $10^{-8}$ between 'is' and $\Delta$is. Therefore, it is vitally important to eliminate 'is' in order to reliably detect $\Delta$is. Resistance RL in FIGS. 1A and 1B is introduced for this purpose. By adjusting RL with a switch SW set on, it is possible to select an appropriate value for 'is' by means of the bias applied by the power source −Vs to take away 'is' from the signal. Then, only $\Delta$is flows through feedback resistance Rf and appears as an output Vo.

With the above described arrangement, the AFM effectively and efficiently detects the change in the piezo resistance. In this example, a probe having a piezo resistance Rs of 10 kΩ and a sensitivity of $\Delta Rs/Rs=10^{-8}$ was used with an applied voltage of Vs=1V and a resistance of Rf=1MΩ to successfully obtain a clear AFM image. While intra-planar resolution was dependent on the diameter of the tip of the probe, which was as large as about 10 nm in this example, the apparatus showed a high sensitivity in the direction perpendicular to the surface of the spectral with a resolution of 0.1 nm.

Now, the operation of the STM (for measuring the electric current) will be discussed by referring to FIG. 1B. Electric current ΔiT flowing through the resistance RT between the-specimen and the probe is measured by the STM. The electric current to be detected will be greater than 10 nA because the resistance RT exceeds 100MΩ. Therefore, it will be difficult to detect ΔiT effectively when electric current flows due to the applied voltage Vs. Taking this into consideration, it is so arranged for the STM to make Vs equal to zero so that no voltage may be applied to the piezo resistance. Then, a voltage VT is applied to the specimen to cause electric current ΔiT to flow. Under this condition, ΔiT flows to both the Vs side and the amplifier side on a half and half basis because Vs is equal to zero. In other words, the current flowing to the amplifier is equal to ΔiT/2. Additionally, if the lever carrying the piezo resistance is deflected to change the resistance during the operation of measuring the electric current, ΔiT is very small because the piezo resistance which is about 10 kΩ is very small and negligible relative to the resistance between specimen and the probe that is as large as 100MΩ. Thus, the influence of the change in the piezo resistance on the ΔiT is further small and hence much more negligible. Then, it is necessary to open SW for separating the system of RL and −Vs provided to "absorb" the electric current. With this arrangement, ΔiT/2 is totally transformed to output Vo through the feedback resistance Rf.

With the above operation, the electric current is measured effectively and efficiently. In this example, a specimen obtained by causing Au to epitaxially grow on a cleaved mica substrate was observed. The Au was biased by VT=2V and the same probe unit used as an AFM was used for an STM observation to successfully obtain an excellent current image showing grains specific to epitaxially grown Au that are as large as several hundreds of nanometers. When an AFM observation and an STM observation were conducted sequentially for the same micro-region, it was proved by the profiles of the observed grains that the image obtained by the AFM completely agreed with the one obtained by measuring the electric current. Thus, this example proves that both the undulations on the surface of a micro-region of a specimen and the electric properties of the region can be observed by means of the same probe unit according to the invention.

EXAMPLE 2

Figure 4:
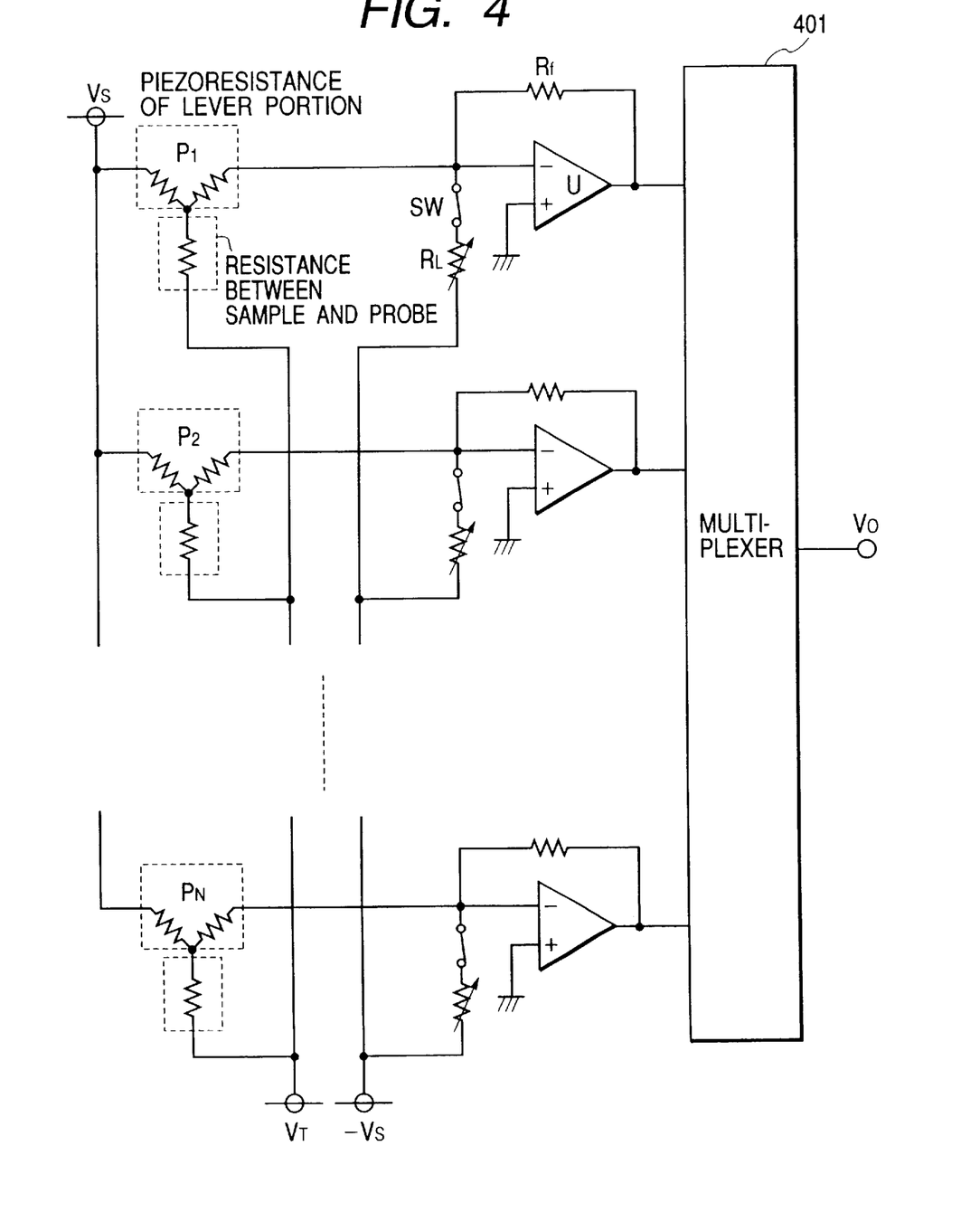
FIG. 4 is a schematic circuit diagram of the signal detecting section of the embodiment of a detection apparatus according to the invention in Example 2.

In this example, a multi-probe AFM/STM apparatus was prepared by using a plurality of probe units, each of which was the same as the one prepared in Example 1. The overall system configuration is identical with the one illustrated in FIG. 2 except that the system comprises a plurality of probes 201 and signal measurement sections 204. Since each of the probes is prepared by way of a semiconductor process as in Example 1, it is easy to arrange a plurality of probes having identical characteristics. FIG. 4 is a schematic circuit diagram of the signal measurement system of the embodiment of a detection apparatus according to the invention in Example 2. The probes has respective piezo resistances of the lever portions P1 through PN, N representing the number of probes. VT represents the potential of the specimen observed when a bias is applied by a bias-applying circuit 211 as shown in FIG. 2.

Both an AFM observation and an STM observation (for measuring the electric current) were conducted by operating the apparatus as in Example 1. More specifically, the SW is turned on for an AFM observation and a predetermined voltage was applied as Vs. Then, VT is made equal to Vs/2 and the variable resistances RT were set to respective values selected depending on the variances of the piezo resistances. During the operation of the STM observation, on the other hand, Vs is made equal to zero and a predetermined voltage is used for VT, while SW is turned off so that no electric current is absorbed. The outputs of the amplifiers U are selectively used by a multiplexer 401 that is arranged downstream to provide an output of Vo, which is then input to the controller 210 shown in FIG. 2 and demultiplexed for each of the probes to obtain its output that may then typically be sent to the monitor 205.

In this example, a specimen obtained by causing Au to epitaxially grow on a cleaved mica substrate was observed as in Example 1. A total of ten probes were used. The piezo resistance Rs of each of the probes was 10 kΩ and the sensitivity $\Delta Rs/Rs$ was $10^{-8}$, while Rf was made equal to 1MΩ and Vs=1V was used for the AFM observation whereas VT=2V was used for the STM observation, showing that the apparatus could observe the specimen with a high sensitivity in the direction perpendicular to the surface of the specimen. The AFM resolution was 0.1 nm as in Example 1. When an AFM observation and an STM observation were conducted sequentially for the same micro-region, it was proved by the profiles of the observed grains that the image obtained by the AFM completely agreed with the one obtained by measuring the electric current. Thus, this example also proves that both the undulations on the surface of a micro-region of a specimen and the electric properties of the region can be observed by means of the same probe unit according to the invention.

EXAMPLE 3

In this example, an observation system was prepared by using a detection apparatus according to the invention. It will be described below.

Figure 5:
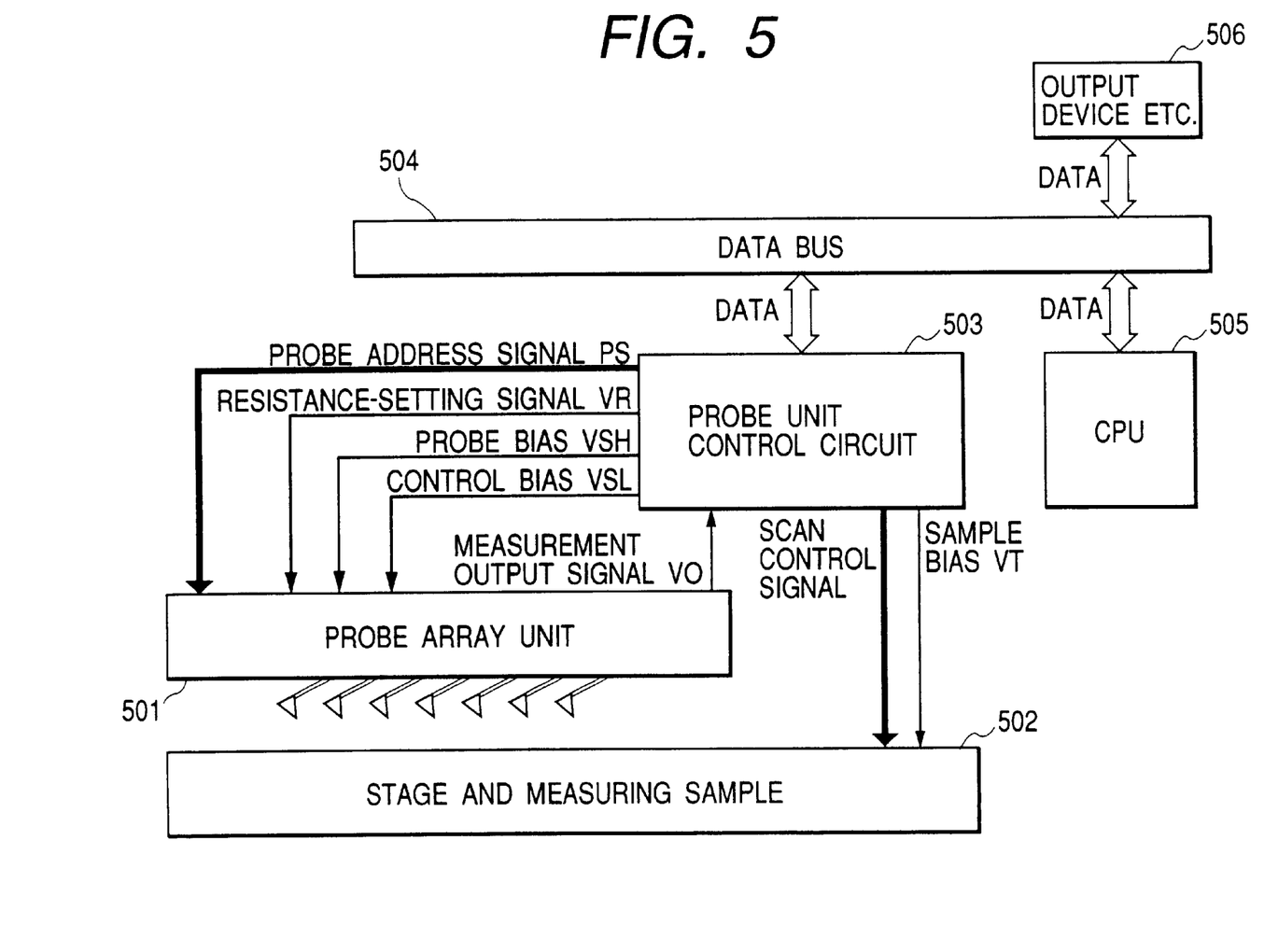
FIG. 5 is a schematic block diagram of the multi-probe AFM/STM system used in Example 3.

FIG. 5 shows the overall configuration of the multi-probe AFM/STM observation system used in this example. A probe array unit 501 of the system has a configuration as will be described hereinafter by referring to FIG. 7. A measurement output VO is sent to a probe unit control circuit 503. This probe unit control circuit 503 outputs various output values (as will be described hereinafter) selected to control the probe array unit 501 and the data obtained by measurement to a data bus 504 in response to a request from a central processing unit (CPU) 505. The data sent to the data bus 504 may be processed by the central control unit (CPU) 505 and/or read directly by an output device 506 according to the command from the central control unit (CPU) 505. The output device 506 may be a monitor typically comprising a CRT, a printer and/or a network. Thus, the output device 506 may refer to one or more than one devices that receive the same data simultaneously. Although not shown, the central control unit 505 receives command signals from the operator and sends the parameters specified by the command signals to the probe unit control circuit by way of the bus. The parameters may include the scope of observation, the observation start point, the observation speed, the bias to be applied to the specimen for observing the electric current flowing therethrough and the characteristics values of each of the probes that are obtained in advance (including the piezo resistance value, the gauging ratio, etc.). The probe unit control circuit 503 controls the probe array unit 501 and the stage 502 according to the parameters it receives.

Now, the probe array unit 501 will be described in greater detail by referring to FIG. 7. The probe array unit 501 is provided with a plurality of AFM/STM probes having piezo resistances (P1, P2 and so on). Each of the probes has the same profile as the one described above in Example 1 and a structure as shown in FIGS. 1A and 1B.

Figure 7:
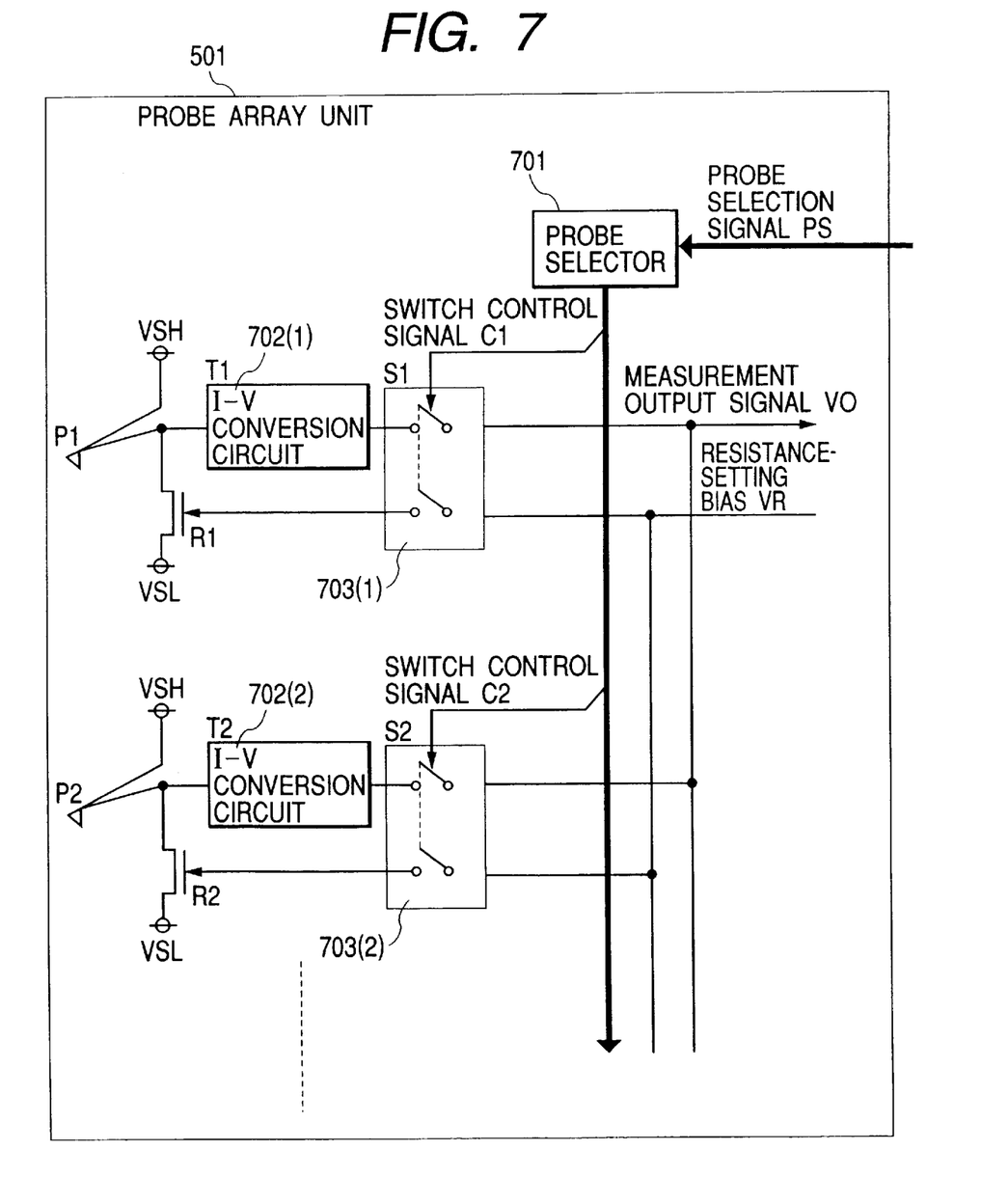
FIG. 7 is a schematic circuit diagram of the probe array unit of a detection apparatus according to the invention.

A voltage VSH is applied to an end of each of the probes to observe the piezo resistance, while a control voltage VSL is applied to the other end of the probe by way of a MOSFET (such as R1 or R2 in FIG. 7). These voltage values are selected by the probe unit control circuit 503 shown in FIG. 5 and the contact of the MOSFET and the lever is input to an I/V conversion circuit (such as T1 or T2 FIG. 7). The electric current flowing to the I/V conversion circuit is converted into a voltage signal, which is then sent to a double switch (such as S1 or S2 in FIG. 7). After passing through the switch, the signal is output as the measurement output signal VO. Resistance-setting bias VR is applied to the gate of the MOSFET by way of the switch (such as S1 or S2) so that the MOSFET operates like the variable resistance RL shown in FIGS. 1A and 1B by controlling the VR. A probe selector 701 outputs a switch control signal (such as C1 or C2 in FIG. 7) that controls the switching operation of each of the double switches (such as S1 or S2) connected to the corresponding probe.

The probe array unit 501 operates in a manner as described below. To begin with, the AFM operation of the unit will be discussed. When a probe selection signal PS is input to a probe selector 701, it closes only the switch (to be assumed as switch Sn) of the probe specified by the selection signal PS and keeps all the remaining switches open. As a result, the output of the corresponding I/V conversion circuit (Tn) is linked to the measurement output signal VO, at the same time and the corresponding resistance-setting bias VR is applied to the gate of the MOSFET (Rn) to make the latter have a predetermined resistance. The electric current produced by the voltage VSH passes through the piezo resistance lever (Pn) and is partly absorbed by the MOSFET (Rn), and the remaining current flows into the I/V conversion circuit (Tn). The electric current contains the signal component representing the deflection of the lever and therefore represents the undulations of the surface of the specimen being observed as described above by referring to Example 1. As described above, the output of the I/V conversion circuit (Tn) is linked to the measurement output signal VO, the measured value from the probe (Pn) is output as VO. When measuring the electric current, the MOSFET is made completely open by lowering the resistance-setting bias VR to a level lower than the VSL. The VSH is set to 0V. The operation of the probe selector and that of the switches are identical with those described above for the AFM.

Figure 6:
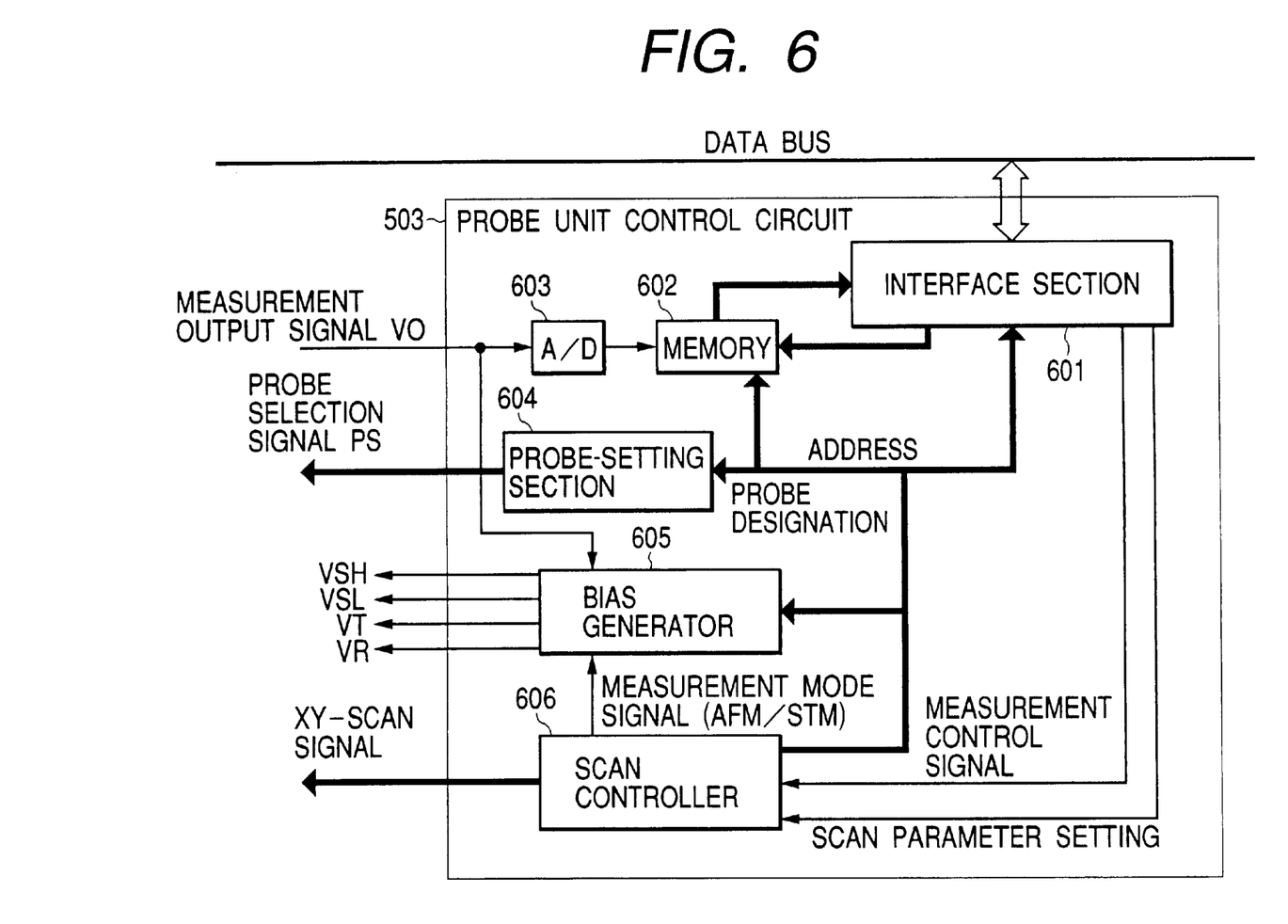
FIG. 6 is a schematic block diagram of the probe unit control circuit of a detection apparatus according to the invention.

Now, the probe unit control circuit 503 will be described in detail. As described above, the probe unit control circuit 503 controls the probe array unit and collects data. It contains therein an A/D converter 603 for digitizing data, a memory 602 for storing the obtained digital data, an interface section 601 for sending some of the data stored in the memory 602 to the bus and obtaining parameters from the bus, a probe-setting section 604 for selecting the probe to be used for measurement, a bias generator 605 for outputting various voltages to be applied for the purpose of measurement and a scan controller 606 for controlling the operation of driving the stage for scanning, placing it in position and addressing various data.

The probe unit control circuit 503 operates in a manner as described below in detail. Upon receiving a measurement start signal from the bus, the interface section 601 defines the area to be measured and selects various scan parameters (including the measurement mode that may be the AFM mode, the STM mode or the AFM/STM mode, the measurement position, the scope of measurement and the scanning rate) for the scan controller 606. Additionally, it triggers the start of the measurement operation by means of a measurement control signal. Still additionally, it outputs some of the measurement data stored in the memory in response to a request from the central control unit (CPU) 505 or some other component. The scan controller 606 that holds the selected parameters selects signals for the respective actuators, rests the addresses for data and starts the scanning operation.

Figure 8A:
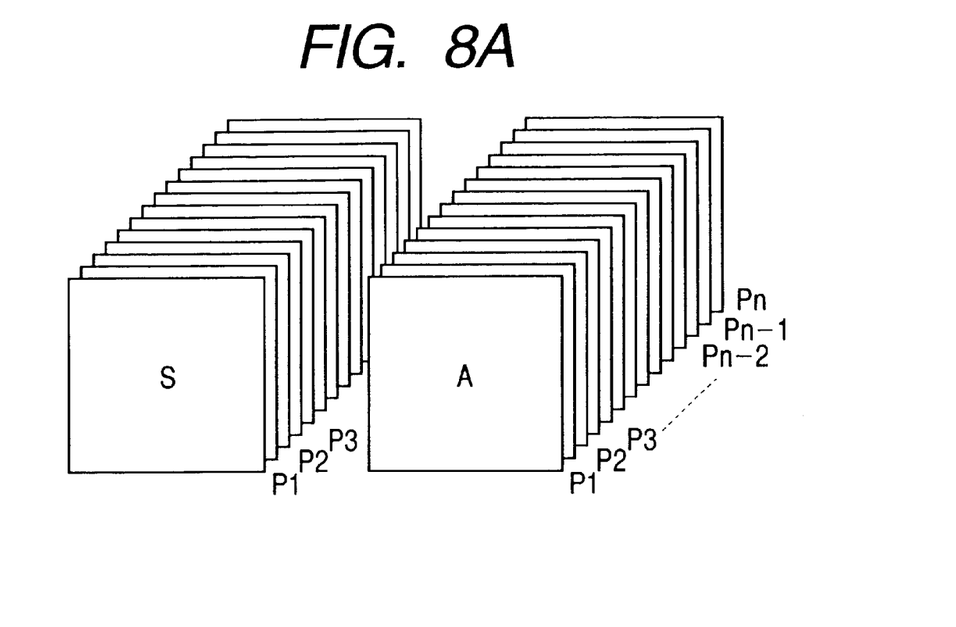
FIGS. 8A and 8B are schematic illustrations of the logical structure of the memory contained in the probe unit control circuit of FIG. 6.
Figure 8B:
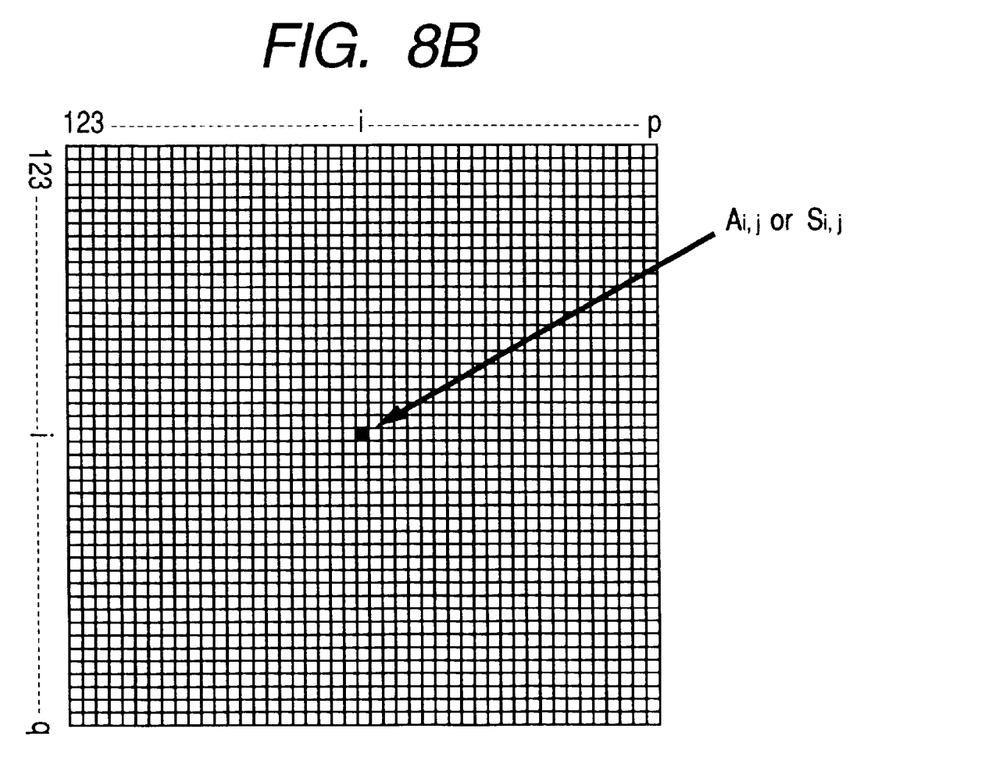

The scan controller 606 outputs an address signal in addition to an XY-scan signal for driving the stage for the scanning operation. The address signal is used to address various measurement data in order to store them in the memory 602. The memory 602 has a logical structure as shown in FIGS. 8A and 8B. The memory is divided into an S-matrix domain for storing data obtained by the STM measurement and an A-matrix domain for storing data obtained by the AFM measurement. Each of the domains contains matrix regions that are laid one on the other and the number of which is equal to that of probes (or n in the case of FIG. 8A). The inside of each of the matrix region reflects the physical positions of the corresponding probe taken for the observation. Referring to FIG. 8B, the area scanned by the probe contains horizontally p dots and vertically q dots, or a total of pxq dots. In other words, these dots are sampled by the probe. It should be noted, however, that FIGS. 8A and 8B are schematic illustrations of the memory 602 and do not accurately show the physical structure of the inside of the memory device.

Thus, the scan controller 606 defines the correspondence of the physical positions on the surface of the specimen with the obtained data by way of addressing as described above and also that of the probes and the mode of measurement with the obtained data. In other words, it outputs the address of the memory where the obtained data is currently being stored. Then, the address signal is received by the memory 602, the probe-setting section 604 and the bias generator 605. The probe-setting section 604 computationally determines the probe to be used for measurement from the address signal it receives and transmits a probe selection signal specifying the probe to be used to the probe array unit 501. Then, the signal of the probe specified by the probe selection signal is received as VO as described above by referring to FIG. 7. The bias generator 605 recognizes the measurement to be conducted is an AFM measurement or an STM measurement on the basis of the address signal it receives and determines the voltages to be used for the measurement.

Now, the operation of the bias generator 605 will be described by way of an example. If it is recognized from the address signal that the measurement to be conducted is an AFM measurement using the probe Pn, the bias generator 605 outputs the VSH and the VSL that are predetermined along with the VT that is equal to VSH/2. It also determines the value of the VR by using the piezo resistance of the probe that is measured and stored in advance and outputs the VR. The value of the VR may alternatively be determined by using the value defined in advance as a bias parameter and obtained from the interface or by using a filter designed to make the DC component of the output signal VO detected on a real time basis equal to zero. If, on the other hand, it is recognized from the address signal that the measurement to be conducted is an STM measurement also using the probe Pn. the bias generator 605 outputs 0V for VSH and there are applied, a predetermined value for VSL, the value of VSL for VR and a predetermined sampling bias for VT. As a result, the electric current flowing between the specimen and the probe can be measured as described above in Example 1.

In this example, a specimen obtained by causing Au to epitaxially grow on a cleaved mica substrate was observed as in Example 1. A total of one hundred probes were used. The probes are arranged longitudinally and transversally to show a matrix of 10×10, where any two adjacently located probes were separated by a distance of 100 μm. The piezo resistance Rs of each of the probes was about 10 kΩ and the sensitivity ΔRs/Rs was $10^{-8}$. The measurement operation was carried out by causing the stage to raster-scan the specimen. More specifically, the specimen was scanned along lines in the main-scanning direction simultaneously, while moving the stage in either of the sub-scanning directions at a low rate. Each of the probes was made to cover an area of 100 μm-square which was sampled for 512 times per raster and a total of 512 rasters were conducted. By referring to FIGS. 8A and 8B, it will be seen that the number of probes is n=100, the number of elements was p=512 per row as well as q=512 per column.

A number of different sequences may be conceivable for the actual sampling operation. For instance, each of the probes may be used for AFM sampling per raster and then for STM sampling per raster. In other words, the probe may be used twice per raster, once for AFM sampling and once for STM sampling. Alternatively, all the probes may be used for AFM sampling for a frame and then they may be returned to the starting positions to carry out an STM sampling operation for the frame. Still alternatively, two samplings of an AFM sampling operation and an STM sampling operation may be carried out before moving the probes to the next respective positions. Any of such alternative sequences may selectively be used by taking the type of the specimen to be observed and the time allowed to observe the specimen into consideration along with other factors. In this example, each of the probes was used twice per raster, once for AFM sampling and once for STM sampling, in order to obtain desired data.

A value of 106V/A was selected for the gain of the I/V conversion. Additionally, VSH=1V and VSL=−1V were used for AFM sampling. As for the VR, it was measured in advance and stored in the memory for each of the probes as a value that makes the output of the probe equal to zero when the deflection of the lever is nil. In other words, the VR was measured for each of the probes and stored in the bias generator 605 in advance. VT=2V was used for STM sampling, indicating that the apparatus could observe the specimen with a high sensitivity in the direction perpendicular to the surface of the specimen exactly as in the case of Example 1. The AFM resolution was 0.1 nm as in Example 1. When an AFM observation and an STM observation were conducted sequentially for the same microregion, it was proved by the profiles of the observed grains that the image obtained by the AFM completely agreed with the one obtained by measuring the electric current. Additionally, because any two adjacently located probes were separated from each other by 100 μm, the coverage of each probe bordered on those of the neighboring probes so that a surface area of 1 $mm^2$ could be observed completely with an enhanced level of resolution.

As described above, according to the invention, a common electric path is used for both the electric current flowing to the piezo resistance of a probe in order to detect the surface profile of a specimen (recording medium) in an AFM observation and the electric flowing between the specimen and the electroconductive probe in order to detect the electric properties of the specimen in an STM observation. As a result it is possible to greatly simplify the configuration of the probe, the wiring arrangement of the detection system and the detection circuit for detecting both the surface profile and the electric properties of the specimen. It is also possible to realize a multi-probe observation system adapted to both AFM and STM observations.

What is claimed is:

1. A detection apparatus for detecting the surface of a specimen by means of a cantilever having a probe and a piezo resistance element comprising:

a first circuit for detecting an electric current flowing through said piezo resistance element; and a second circuit for detecting through said probe an electric current flowing between said probe and said specimen;

wherein the electric current flowing through said piezo resistance element and the electric current flowing between said probe and said specimen are detected by way of a common current path.

2. A detection apparatus according to claim 1, wherein said first circuit includes a means for applying a predetermined voltage to said piezo resistance element and a means for applying a predetermined voltage to said specimen.

3. A detection apparatus according to claim 2, wherein said first circuit further includes a means for removing offset components from the detected current signal.

4. A detection apparatus according to claim 3, further comprising:

a switch means for separating said means for removing offset components from said common current path when detecting the electric current by means of said second circuit.

5. A detection apparatus according to claim 3, wherein said means for removing offset components includes a voltage source for generating a constant voltage and a variable resistor and removes said offset components by adjusting said variable resistor.

6. A detection apparatus according to claim 1, wherein said electric current detected by said second circuit is a tunnelling current.

7. A detection apparatus according to claim 2, wherein a predetermined voltage is applied to said specimen in order to remove an electric current flowing into said common current path by way of said probe when detecting the electric current flowing through said piezo resistance element.

8. A detection apparatus according to claim 7, wherein said voltage applied to said specimen is set to a half of the voltage applied to said piezo resistance element.

9. A detection apparatus according to claim 2, being so designed that no voltage is applied to said piezo resistance element when detecting the electric current flowing between said probe and said specimen.

10. An observation apparatus comprising a detection apparatus according to any one of claims 1 through 9.

11. An observation apparatus according to claim 10, further comprising a plurality of said cantilevers;
a probe array unit having a plurality of said detection apparatus provided for each of said cantilevers; and
a control means for controlling said probe array unit.

12. An observation apparatus according to claim 11, wherein
said control means conducts the selection of a probe to be used for measurement and the setup of the corresponding detection system.

13. A detection method for detecting the surface of a specimen by means of a cantilever having a probe and a piezo resistance element, comprising the steps of:
detecting an electric current flowing through said piezo resistance element; and
detecting an electric current flowing between said probe and said specimen; wherein the electric current flowing through said piezo resistance element and the electric current flowing between said probe and said specimen are detected by way of a common current path.

14. A detection method according to claim 13, wherein
a predetermined voltage is applied to said specimen in order to remove the electric current flowing into said common current path by way of said probe when detecting the electric current flowing through said piezo resistance element.

15. A detection method according to claim 14, wherein
said voltage applied to said specimen is set to a half of a voltage applied to said piezo resistance element.

16. A detection method according to claim 13, wherein no voltage is applied to said piezo resistance element when detecting the electric current flowing between said probe and said specimen.

17. A detection method according to claim 13, wherein
offset components are removed from said detected current signal flowing through said piezo resistance element by means of an offset-removing circuit.

18. A detection method according to claim 17, wherein said offset-removing circuit is separated from said common current path when detecting the electric current flowing between said probe and said specimen.

19. An observation method comprising a detection method according to any one of claims 13 through 18.

20. An observation method according to claim 19, wherein
said cantilever is of a multiple type having a plurality of cantilevers and said detection method is conducted independently for each of the cantilevers.

* * * * *